April 20, 1965 J. R. JASSE 3,179,052
DRAG COLLAR FOR VARYING THE RANGE OF ROCKETS
Filed June 21, 1962 2 Sheets-Sheet 1
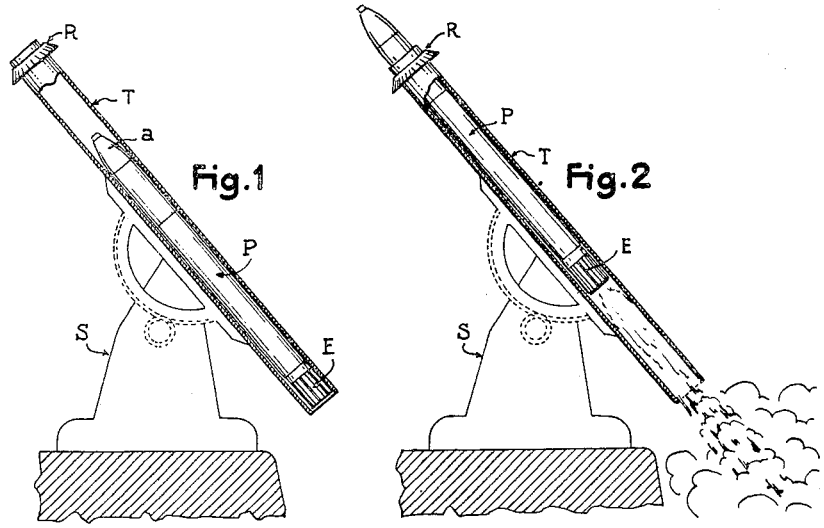
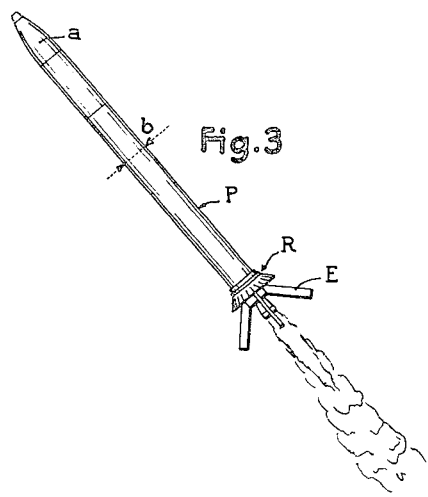

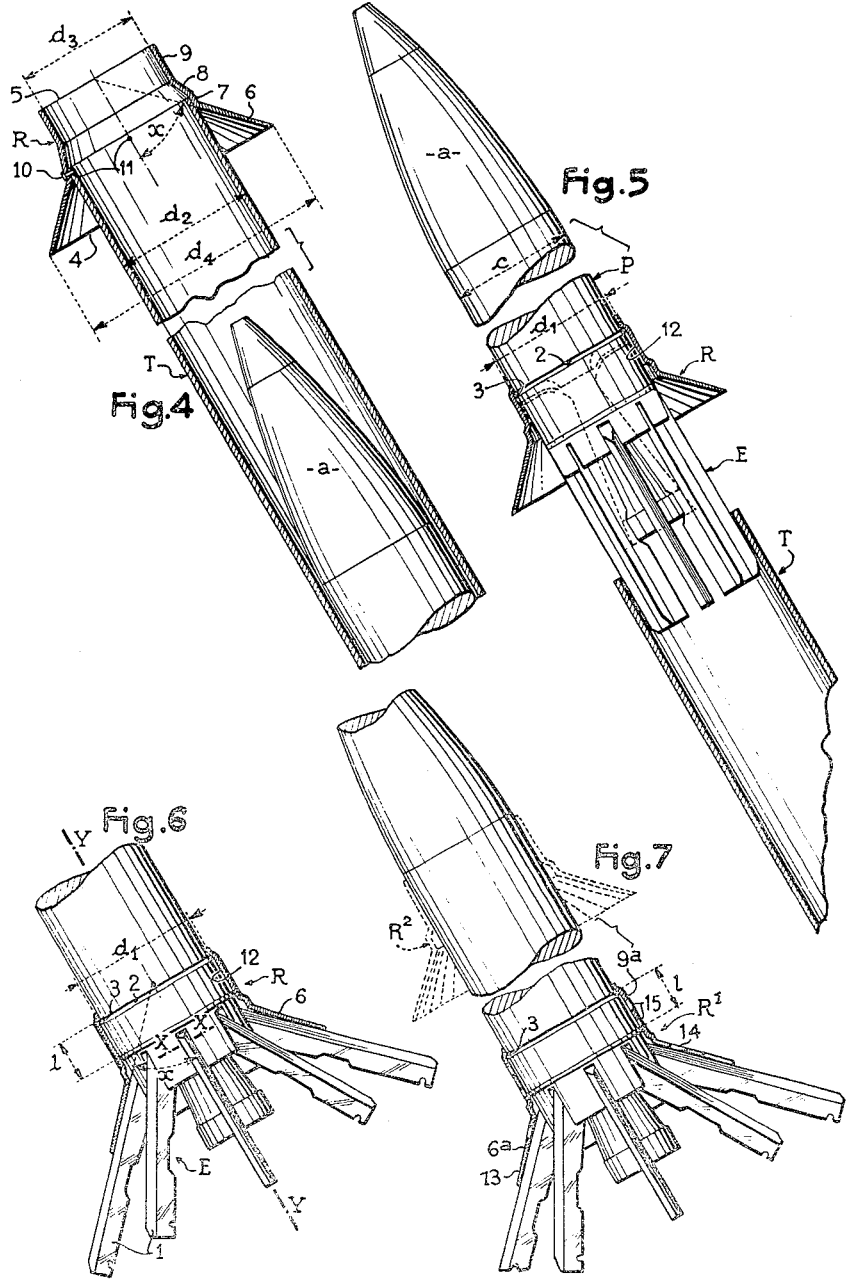

3,179,052
DRAG COLLAR FOR VARYING THE RANGE
OF ROCKETS
Joseph Raymond Jasse, Paris, France, assignor to Hotchkiss-Brandt, Paris, France, a French body corporate
Filed June 21, 1962, Ser. No. 204,166
Claims priority, application France, June 29, 1961, 866,524, Patent 1,300,922
3 Claims. (Cl. 102—50)

The present invention relates to rockets and more particularly to rockets of the "ground-to-ground" type, namely rockets which are fired from the ground at a ground target.

In the case of a projectile which issues from a gun tube at a certain initial speed and does not receive on its trajectory a thrust from a jet-propelling means such as in the case of a "shell" projectile, it is easy to regulate the range by varying the elevation of the gun tube and the initial speed by varying the propelling charge.

In the case of a rocket or self-propelled projectile, however, the variation in the range as a function of the angle of elevation of the launching tube follows a very different law and the straying of the projectile becomes inacceptable in respect of angles less than 35°. Furthermore, it is practically impossible to vary the propelling charge.

An object of the present invention is to avoid these drawbacks by employing a method of varying, by simple means, the range of the rocket, particularly in ground-to-ground firing, without changing the angle of elevation of the launching tube or varying the propelling charge.

Said method comprises, after engaging the rocket in the launching tube, placing on the upper end forming the muzzle of the tube a collar having such inside diameter that, as the rocket penetrates said collar when launched, said collar takes up a position on the body of the rocket, is carried along by the latter on the rocket trajectory and varies the drag and consequently the range.

By so choosing the outside diameter and the shape of this collar it has been found it is possible to definitely vary at will the range of the rocket for a given self-propelling charge and/or launching charge.

Another object of the invention is to provide a collar for carrying out said method. Said collar is so shaped as to possess in succession, starting at its large base, a first portion in the shape of a truncated cone or like shape adapted to create the drag, a cylindrical portion adapted to enable fitting the collar on the end of the launching tube, a second portion in the form of a truncated cone, and finally a cylindrical portion whose inside diameter is less than the diameter of a portion of the rocket to be launched.

Another object of the invention is to provide the combination of such a collar with a rocket having a rear fin arrangement, said rocket comprising forward of said fin arrangement a groove in which is disposed a ring projecting from the outer face of the rocket and having a diameter between the diameters of the large and small bases of said second conical portion of the collar.

Thus, when the rocket penetrates the collar, the ring elastically deforms said second conical portion, then the cylindrical portion of small diameter following on said second conical portion and thus elastically absorbs the inertia of the collar which must assume the velocity of the rocket from zero velocity.

Further features and advantages of the invention will be apparent from the ensuing description with reference to the accompanying drawings to which the invention is in no way limited.

In the drawings:

FIG. 1 is a diagrammatic view of an apparatus including a launching tube in which the rocket to be launched has been introduced and the drag collar placed on the muzzle of the tube;

FIG. 2 is a similar view showing the rocket at the beginning of its launching when it enters the collar;

FIG. 3 is an elevational view of the rocket on its trajectory with the drag collar placed, for example, just in front of the opened-out fin arrangement;

FIGS. 4, 5 and 6 are partial views on an enlarged scale corresponding respectively to FIG. 1, to a portion similar to that shown in FIG. 2 but with the rocket penetrating the collar a little more, and to FIG. 3, and FIG. 7 is a partial view of a rocket showing a modification of the collar in two different positions.

In the embodiment shown in FIGS. 1–6 the invention is applied to a launching of a projectile P, constituted by a rocket having a rear fin arrangement, by means of a launching tube T mounted in known manner on a support S so that it is possible to give the required orientation to this tube.

According to the invention, after having placed the projectile P in the tube T as shown in FIG. 1, a collar R is placed on the upper or muzzle end of the tube T, this collar having such inside diameter that the projectile, when launched by a normal launching charge (not shown), engages its forward ogive $a$ in said collar as shown in FIG. 2 and carries it along as shown in FIG. 3.

In this way, it is possible to vary as desired the drag produced by this collar and consequently the range of the projectile by selecting suitable dimensions and shapes of the collar.

Thus the difficulty residing in the fact that it is impossible to provide a projection previously fixed to the body of the self-propelled projectile since this projection would prevent its introduction into the launching tube T, is avoided.

With reference now to FIGS. 4 to 6 which show on an enlarged scale various details of the projectile and a collar more particularly adapted to the function for which it has been designed, the projectile P is provided at the rear with a fin arrangement E whose fins 1 are mounted for pivotal movement about transverse axes, such as the axis X—X (FIG. 6), contained in a plane perpendicular to the longitudinal axis Y—Y of the projectile.

The fin arrangement can thus be folded as shown in FIGS. 1, 2 and 5 as long as the projectile B is at least partially located within the tube T, whereas it assumes the opened out arrangement in the form of an umbrella or cone as shown in FIGS. 3 and 6 when the projectile is on its trajectory. Each fin then makes an angle $x$ with the axis Y—Y.

Forward of the fin arrangement E, the projectile comprises a groove 2 in which is engaged an elastic ring 3. This ring projects from the groove 2, its outside diameter $d_1$ being slightly greater than the diameter or calibre $c$ of the projectile.

With regard to the collar R, which can be of sheet metal or other material of sufficient strength, it is obtained by a press-operation or by casting in a mould and comprises in succession, starting at its large rear base 4 and ending at its small forward base 5: a first portion 6 in the form of a truncated cone whose semi-apex angle is equal to, or greater than, the angle $x$ mentioned hereinbefore formed by an opened fin with the longitudinal axis of the projectile; a first cylindrical portion 7 whose inside diameter $d_2$ corresponds, apart from a very slight clearance, to the outside diameter of the launching tube T; a second portion 8 having the shape of a truncated cone and a semi-apex angle preferably less than the angle $x$;

and a second cylindrical portion 9 having an inside diameter $d_3$.

The outside diameter $d_1$ of the ring 3 is between the diameters $d_2$ and $d_3$ of the large and small bases respectively of the second conical portion 8.

The result of the foregoing dimensions is that, on the one hand, the collar R can be engaged by a cylindrical portion 7 on the muzzle of the launching tube T and, on the other hand, the ring 3 abuts the inner face of the conical portion 8 when, owing to the launching of the projectile B, this ring reaches the collar.

In order to preclude the collar R leaving for any reason the tube T or being out of position across this tube, before launching the projectile and at the moment of this launching, the collar R is preferably connected to the tube T by a screw 10, for example of brass which extends through the cylindrical portion 7 of the collar and is screwed in small tapped holes formed at 11 in the tube T. Under these conditions, the collar is held perfectly in position in a temporary manner and as it is carried off by the projectile D the screws 10 shear.

Owing to the provision of the ring 3 and the respective dimensions of the diameters $d_1$, $d_2$ and $d_3$, when this ring encounters the inner face of the conical portion 8 of the collar it progressively forms for itself a housing in this collar in increasing to the diameter $d_1$ first, the part of the portion 8 located between the line on which the ring comes in contact with the portion 8 and the small base of the latter thus imparting a cylindrical shape to this part, and then a fraction of the axial length of the deformable cylindrical portion 9, as can be seen at 12 in FIGS. 5 and 6. It will be understood that the collar's material and thickness must be so chosen that, taking into account the inertia of the collar, this inertia can be overcome and the collar finally rendered integral with the projectile B before the ring 3 has reached the end of the portion 9, the axial travel of the ring 3 in the collar thus being $l$ (FIG. 6).

As will be understood, during the displacement $l$, the ring applies an axial force to the collar and the work done on this collar is equal to the product of this force (F) and the deformed length $l$ or, in more general terms, to the integral of this product, if the force varies along the deformation travel $l$. Consequently, by suitably selecting the length $l$, the thickness of the deformed part and/or the resistance of the material employed, it is possible to arrange that the work done on the collar is equal to the kinetic inertia of said collar $mv^2/2$ where $m$ is the mass and $v$ the speed at which the rocket issues from the launching tube.

FIG. 6 shows the collar R on the projectile when the latter is on its trajectory. It can be seen that its conical portion 6 which produces the drag is substantially applied against the fins of the arrangement E.

From the above it will be appreciated that in accordance with the invention there is provided a collar having a front and a rear and which is adapted for being attached to the rocket P, the rocket including a body with a determinable maximum diameter as indicated at $b$, there being provided means such as the ring 3 on the body to provide an enlarged portion having an outer diameter which is greater than the aforesaid maximum diameter, this outer diameter being indicated at $d_1$.

It will be further appreciated that the collar comprises interconnected in sequence from the rear a forwardly convergent annular flange 6, adapted to create drag and having a minimum diameter at its forwardmost end exceeding the aforesaid outer diameter, the collar further comprising a first cylindrical portion 7 having an inside diameter exceeding the aforesaid outer diameter and adapted to be fitted onto the muzzle end of the rocket launching tube T.

The collar of the invention further comprises a deformable annular portion 8, having a forwardly convergent inner face with maximum and minimum diameters respectively greater than and less than the aforesaid outer diameter. Moreover there is provided a deformable second cylindrical portion 9 adjoining the annular portion 8 and having an inside diameter which is less than the aforesaid outer diameter. The annular portion 8 and the second cylindrical portion 9 are adapted for being deformed by the enlarged portion or ring 3 of the rocket, whereby upon launching the rocket through the launching tube, the enlarged portion forces its way into the second cylindrical portion 9 and provides a close-fitting support for the collar.

As noted above, the first cylindrical portion 7 is provided with openings for accommodating the shear bolts or pins 10 for connecting the collar to the launching tube. Also to be noted is the fact that the annular flange 6 has a greater apex angle than the annular portion 8.

The scope of the invention is not restricted to the shape of the collar R in the embodiment just described. FIG. 7 shows a collar $R^1$ whose rear conical portion 6a is provided with notches 13 and apertures 14 which permit reducing the drag or more precisely regulating it by trial shots, whereas the forward cylindrical portion 9a is itself provided with apertures 15 which also permit by their number and their distribution regulating the length $l$ of the passage formed by the ring 3 in the collar before it is finally driven along by the rocket at the speed of the latter.

If desired, the collar can be arranged to stop in a more advanced position, such as that shown at $R_2$ (FIG. 7).

Although specific embodiments of the invention have been described, many modifications and changes may be made therein without departing from the scope of the invention as defined in the appended claims.

Having now described my invention what I claim as new and desire to secure by Letters Patent is:

1. A collar having a front and a rear and adapted for being attached to a rocket including a body with a determinable maximum diameter and means on said body to provide an enlarged portion having an outer diameter greater than said maximum diameter, so as to modify the range thereof, said collar comprising, interconnected in sequence from the rear: a forwardly convergent annular flange adapted to create drag and having a minimum diameter exceeding said outer diameter, a first cylindrical portion having an inside diameter exceeding said outer diameter and adapted to be fitted onto the muzzle end of a rocket launching tube adapted for launching said rocket, a deformable annular portion having a forwardly convergent inner face with maximum and minimum diameters respectively greater than and less than said outer diameter, and a deformable second cylindrical portion adjoining the annular portion and having an inside diameter which is less than said outer diameter, said annular portion and the second cylindrical portion being adapted for being deformed by said enlarged portion of the rocket whereby upon launching the rocket through the launching tube said enlarged portion forces its way into said second cylindrical portion and provides a close-fitting support for the collar.

2. A collar as claimed in claim 1 wherein said first cylindrical portion is provided with openings for connecting the collar to a launching tube.

3. A collar as claimed in claim 1 wherein the annular flange has a greater apex angle than said annular portion.

References Cited by the Examiner
UNITED STATES PATENTS

| 843,385 | 2/07 | Behr | 102—89 |
| 1,181,203 | 5/16 | Alard | 102—50 |
| 1,294,604 | 2/19 | Berentsen | 89—1 |

SAMUEL FEINBERG, *Primary Examiner.*

ARTHUR M. HORTON, *Examiner.*